United States Patent [19]

Bahadir et al.

[11] 4,452,912

[45] Jun. 5, 1984

[54] PROCESS FOR PRODUCING A SUPPORTED CATALYST FOR THE POLYMERIZATION OF α-OLEFINS

[75] Inventors: Müfit Bahadir, Zolling; Wolfgang Payer, Wesel, both of Fed. Rep. of Germany

[73] Assignee: Ruhrchemie Aktiengesellschaft, Fed. Rep. of Germany

[21] Appl. No.: 441,792

[22] Filed: Nov. 15, 1982

[30] Foreign Application Priority Data

Jun. 23, 1982 [DE] Fed. Rep. of Germany ....... 3223331

[51] Int. Cl.$^3$ .......................... C08F 4/02; C08F 4/64; C08F 4/68
[52] U.S. Cl. .................................... 502/111; 502/104; 502/120; 502/132; 502/133; 526/124
[58] Field of Search ............... 252/429 B, 429 C, 428, 252/430; 502/104, 111, 133, 132, 120

[56] References Cited

U.S. PATENT DOCUMENTS 3,135,809 6/1964 Bosmajian .................. 252/429 A X
4,148,754 4/1979 Strobel et al. .................. 252/429 C
4,333,851 6/1982 Speakman et al. .............. 252/429 B

*Primary Examiner*—Patrick Garvin
*Attorney, Agent, or Firm*—Jordan B. Bierman; Linda Bierman

[57] ABSTRACT

The invention relates to a process for producing a magnesium-containing supported catalyst for the polymerization and copolymerization of α-olefins. The magnesium is bound via oxygen to a porous metal oxide; e.g. silicon dioxide and/or aluminum oxide, and has alkoxy groups. This solid is reacted with a transition metal compound and one or more organometallic compounds of Groups I to III of the Periodic Table are added.

33 Claims, No Drawings

PROCESS FOR PRODUCING A SUPPORTED CATALYST FOR THE POLYMERIZATION OF α-OLEFINS

This Application claims priority of German Application No. P 32 23 331.0 filed June 23, 1982.

The present invention relates to a process for producing a magnesium-containing supported catalyst for the polymerization and copolymerization of α-olefins.

DOS No. 21 09 273 teaches the production of components for Ziegler type catalysts by the action of organic aluminum compounds or Grignard compounds on hydroxyl group-containing finely divided metal oxides; e.g. silicon dioxide and/or aluminum oxide. The washed reaction product is then reacted with a transition metal halide. In combination with an organometallic compound of Groups 1 to 3 of the Periodic Table, the solid obtained provides a catalyst for olefin polymerization.

In another process for producing catalysts for olefin polymerization, silicon dioxide and/or aluminum oxide are used as starting substances. The hydroxyl group content of the oxides is first determined in a preliminary reaction by conversion with Grignard compounds. The stoichiometric amount of the Grignard reagent is then added and the resultant product is reacted, again avoiding an excess, with a transition metal compound. Washings to remove excess soluble catalyst components are advantageously omitted, thus avoiding effluent problems. The above-mentioned organometallic compounds are used as activators in olefin polymerization.

Both of these catalyst systems suffer from the disadvantage that their activity is not sufficiently high, amounting to only about 400 to 3300 g of polyethylene per g of titanium per ethylene pressure in bars per hour at 85° C.

An object of the present invention is, therefore, to develop a process for producing supported catalysts of improved activity for the polymerization of α-olefins.

Another object of these catalysts is to provide high molecular weight polyolefins for molding operations.

A further object is to provide polyolefins whose molecular weights can readily be adjusted with molecular weight regulators such as hydrogen, so that polyolefins with good melt properties, which can be processed in conventional screw-type machines, are obtained.

Surprisingly, these objectives are achieved by a process for producing a magnesium-containing supported catalyst for the polymerization or copolymerization of α-olefins by reacting finely particulate, porous metal oxide containing magnesium monoalkoxy groups bound via oxygen, with a transition metal compound, and adding one or more organometallic compounds of Groups I to III of the Periodic Table (catalyst component II) to the resultant particulate solid (catalyst component I).

The catalysts produced according to the claimed process produce high molecular weight polymers and also, with simple molecular weight regulation using hydrogen, polymers of medium to low molecular weights. Silicon oxides, such as silicic acid, silica gel and/or aluminum oxides, which are porous and have a large surface area are particularly suitable for the new process. The particles conveniently have a particle size (diameter) of 1 to 250 μm. Oxides with a pore volume of 0.1 to 2 cm$^3$/g and a specific surface of 50 to 1000 m$^2$/g, and especially 200 to 600 m$^2$/g, are preferred. Of particular importance is the fact that these metal oxides also have reactive hydroxyl groups.

Various methods are possible for preparing the metal oxides containing magnesium monoalkoxy groups bound via oxygen. Two of these methods are illustrated by the following reaction equations using a silicon dioxide as an example.

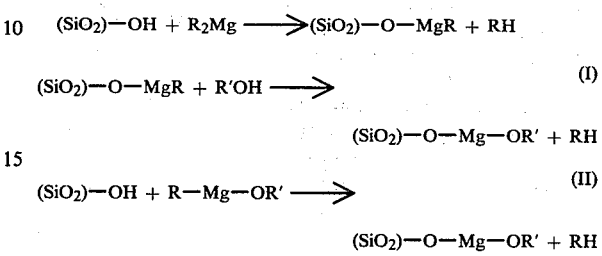

According to (I), the finely particulate, porous, hydroxyl group-containing metal oxide is first reacted with a magnesium dialkyl or diaryl compound. The magnesium compound can be used in excess. The reaction product is then reacted with an alcohol, after the excess magnesium compound has been washed out. The diorgano magnesium compound corresponds to the general formula $R^1R^2Mg$, wherein $R^1$ and $R^2$ are the same or different and denote straight and/or branched chain alkyl radicals with 1 to 16 carbon atoms and/or unsubstituted or substituted phenyl radicals. The alcohol is employed in an equivalent amount, and has the general formula $R^3OH$, wherein $R^3$ denotes straight or branched chain alkyl radicals with 1 to 10 carbon atoms.

Another synthesis pathway is illustrated in (II). In this case, the hydroxyl group-containing, finely particulate, porous metal oxide is reacted directly with a monoalkyl or monoaryl alkoxide of the general formula $R^1$—Mg—$OR^3$, wherein $R^1$ and $R^3$ are the same as above. In this variation the separate alcoholysis step is thus omitted.

The dialkyl, diaryl and alkylaryl magnesium compounds used in the claimed process contain straight and/or branched chain alkyl radicals with 1 to 16 carbon atoms and/or unsubstituted or substituted phenyl radicals. The alkoxide radicals contain straight or branched chain alkyl groups with 1 to 10 carbon atoms.

Organomagnesium alkoxides are commercially available products, and can be produced in a known manner; e.g., partial alcoholysis of diorgano magnesium compounds and alcohols.

In practice, the metal oxide is dried at about 120° to about 600° C. before reaction with the organic magnesium compound, and is activated if necessary. Depending on the temperature and drying time, a specific hydroxyl group content is thus established on the surface of the oxide by this treatment. In order to maintain this content constant, the metal oxide is stored under an inert gas and with the exclusion of moisture.

To react the metal oxide particles with the organomagnesium compound, the dried oxide is suspended in a hydrocarbon in an inert gas atmosphere with the exclusion of moisture, and the organomagnesium compound is added in the form of a solution in a hydrocarbon or hydrocarbon mixture. The organomagnesium compound is used in an equivalent amount to, or in excess of, the hydroxyl group content of the metal oxide, which has previously been determined by a suitable method (e.g. Zerewitinow's method described in Organikum, VEB, Deutscher Verlag der Wissenschaften, Berlin 1968, 8th edition, P. 485).

The reaction temperature and reaction time depend on the reactivity of the organomagnesium compound employed. The conversion is normally carried out at 25° to 150° C. and is generally complete after about 1 to about 40 hours. It has been found that organomagnesium alkoxides require higher temperatures and longer reaction times than dialkyl- or diarylmagnesium compounds. Temperatures of about 125° to about 140° C., and reaction times of about 20 to about 30 hours, are normally sufficient.

The boiling point range of the hydrocarbons used as suspension agents for the metal oxides and as solvents for the magnesium compounds is dependent upon the reaction temperature, unless the reaction is carried out under elevated pressures. Suitable hydrocarbons are (cyclo) alkanes such as hexane, cyclohexane, methylcyclohexane, heptane, octane isomers and higher alkanes such as hydrogenated diesel oil fractions; e.g. with a boiling point range of about 135° to about 170° C., hereinafter termed diesel oil.

When the conversion is complete, the soluble, unreacted organomagnesium compounds are washed out by repeating decanting with a suspension agent, so that only the magnesium compounds chemically fixed on the metal oxide surface remain.

If the metal oxide is reacted with an organomagnesium alkoxide, the magnesium monoalkoxy group bound to the metal oxide surface via oxygen atoms is directly available. The completeness of the reaction can be tested by means of $TiCl_4$, since, according to the reaction equation (II), no free organomagnesium compounds are present. In this case, $TiCl_4$ is not reduced by a sample from the suspension, and the suspension remains lightly-colored. If on the other hand a reduction to the darker-colored $TiCl_3$ occurs, the temperature treatment must be continued until a new sample of the suspension no longer reduces $TiCl_4$.

The duration of the post-reaction and the reaction temperature depend on the reactivity of the magnesium compound and alcohol employed. In general, reaction times of about 1 to about 40 hours at temperatures of about 25° to about 150° C. are sufficient in this case too.

The suspension of a magnesium alkoxy group-containing metal oxide prepared as previously described is then reacted with the transition metal compound. Such compounds include halides, halogen alkoxides, and/or alkoxides of metals of Sub-Groups IV to VI of the Periodic Table. The compounds may be used individually or as a mixture. Particularly suitable are titanium (IV) compounds of the general formula $TiX_n(OR)_{4-n}$, wherein n=0 to 4, X denotes chlorine, bromine or iodine, and R denotes a hydrocarbon radical, especially an alkyl, aryl or aralkyl radical with 1 to 12, preferably 1 to 8, carbon atoms. Examples of such compounds are titanium tetrahalides, titanium tetraalkoxides and/or alkoxy titanium halides. Vanadium compounds such as vanadium tetrahalides, vanadium oxytrihalides, alkoxy vanadium halides and mixtures of vanadium and titanium compounds may also be successfully used. The molar ratio of transition metal compound to the magnesium compound fixed to the metal oxide is 0.1 to 10, preferably 0.5 to 2.

The reaction of the suspended solid particles with the transition metal compound takes place at temperatures of about 25° to about 150° C. within a period of about 1 to about 70 hours, with constant stirring. Specific properties can be given to the catalyst by maintaining certain temperatures and reaction times or a regulated temperature-time program.

The product is washed by repeated decanting with the suspension agent until soluble transition metal compounds can no longer be detected in the wash liquid. The finely particulate solid body (catalyst component I) thus obtained forms, in combination with organic compounds of metals of Groups I to III of the Periodic Table (catalyst component II), highly active polymerization catalysts for the low pressure polymerization and copolymerization of α-olefins.

Organic compounds of metals of Groups I to III that can be used within the scope of the present invention include compounds of the general formula LiR, $MgR_mX_{2-m}$ and/or $AlR_nX_{3-n}$, wherein R denotes straight or branched chain alkyl radicals with 1 to 16 carbon atoms and/or unsubstituted or substituted phenyl radicals, and X denotes Cl, Br, I or H, m=1 or 2, and n=1 to 3. Dialkyl aluminium halide, dialkyl aluminum hydride, alkyl aluminum dihalide, alkyl aluminum hydride, as well as their conversion products with dienes such as isoprene, 1,3-butadiene, 1,4-pentadiene and, in particular, trialkyl aluminum, dialkyl aluminum chloride, alkyl aluminum dichloride, alone or as a mixture, are preferred.

The molar ratio of sub-group metal to organometallic compound in the polymerization catalyst consisting of the components I and II is 1:100 to 1:0.5. The two catalyst components I and II can be combined in advance and/or in the polymerization reactor itself.

The new, very active catalysts can be used according to known methods in solution, suspension and gas phase polymerizations. The particular particle shape of the catalysts is a great advantage for use in gas phase polymerization. These methods can be carried out batchwise or continuously in single-stage and/or multi-stage processes.

The polymerization is carried out at temperatures of about 20° to about 150° C., preferably about 50° to about 150° C., and under atmospheric pressure or at elevated pressures up to about 100 bars, preferably 1 to 50 bars.

The molecular weight can be regulated in a simple manner by feeding in hydrogen. Without the addition of this regulation agent, high molecular weight polymers are obtained which, when sintered on workpieces, have good mechanical properties.

The catalysts of this invention produce, even at low pressures, such high polymer yields that the catalyst-residues incorporated by polymerization may remain in the polymer without discoloring the latter. This is especially so in copolymerizing ethylene with α-olefins of 3–12 carbons. Costly and environmentally harmful measures to remove the catalyst residues are thus not necessary.

The present invention is described in more detail in the following Examples which illustrate but do not limit the invention.

Catalyst A

Precipitated silicon dioxide with a BET surface of 300 m²/g and a pore volume of 1.65 cm³/g (e.g. supplied by Grace under the name GRACE 952) is dried for 6 hours at 600° C. 20 g of this dry silicon dioxide are suspended while stirring in 125 ml of a hydrocarbon fraction (boiling point range: 135°–170° C., hereinafter termed diesel oil) in a dry 1 liter volume, three-necked flask flushed with nitrogen and equipped with a paddle-type stirrer. This suspension is heated to 135° C. and 47.5 mmole (n-C₄H₉)₀.₇₅(n-C₈H₁₇)₀.₂₅Mg(OC₂H₅) (supplied by Schering AG under the name BOMAG-O), dissolved in 87 ml diesel oil, is added dropwise within 1 hour. The suspension is allowed to react for a further 6 hours at 135° C. and is then washed, by repeating decanting, with a total of 125 ml of diesel oil until magnesium can no longer be detected in the wash liquid.

After a further 14 hours stirring at 135° C., no more organomagnesium compound can be detected with TiCl₄ in a sample of the suspension.

34.4 mmoles TiCl₄ dissolved in 46 ml diesel oil is then added dropwise to the suspension within 4 hours at 85° C. and while stirring. The reaction solution is stirred for a further 15 minutes, allowed to cool to 65° C., and diluted with 100 ml of diesel oil by decanting with 6×200 ml diesel oil. The resultant light brown suspension, which contains 34.0 mg atom Ti/l, is used in the following Examples 1 to 3.

Example 1

A dry, 3 liter volume, glass autoclave flushed with nitrogen is charged with 2 l of diesel oil, heated to 80° C., and 2.5 mmoles triethyl aluminum (TEA) and 7.3 ml of catalyst A are added while stirring. Ethylene is forced in at a pressure up to 4 bars and this pressure is maintained throughout the polymerization by the continuous addition of ethylene. 275 g of polyethylene are obtained per hour, corresponding to a polymerization yield of 5730 g polyethylene/g Ti per bar ethylene per hour.

After 5 hours the polymerization is stopped by cooling the reactor and releasing the pressure, as well as by adding isopropanol, and the polymer formed is filtered off and dried. The high molecular weight polyethylene does not have a melt index, and its viscosity number measured according to ISO/R 1191 is 21.7 dl/g.

Example 2

A 3 liter volume, glass autoclave is filled with 2 l diesel oil as in Example 1, and 3/5 mmoles TEA and 10.3 ml Catalyst A are added. When the temperature of the autoclave reaches 80° C., the autoclave is charged with hydrogen at a pressure of up to 1 bar and with ethylene at a total pressure of up to 4 bars. This pressure is maintained by adding ethylene throughout the polymerization.

163 g of polyethylene is formed per hour, corresponding to a polymer yield of 3240 g polyethylene/g Ti per bar ethylene per hour. The polymer processed after 5 hours has a melt index (MFI 190/5) of 0.48 g/10 minutes, and a viscosity number of 3.5 dl/g.

Example 3

The polymerization is carried out under the conditions of Example 2, except that the hydrogen partial pressure is 2 bars and the polymerization temperature is 85° C. The total pressure and amounts of starting substances are unchanged.

125 g of polyethylene is obtained per hour, corresponding t a polymer yield of 3680 g polyethylene/g Ti per bar ethylene per hour. The polymer process after 5 hours has a melt index (MFI 190/5) of 1.9 g/10 minutes, and a viscosity number of 2.5 dl/g.

Catalyst B

Catalyst B is prepared similarly to Catalyst A, except that the reaction of the magnesium-containing solid with TiCl₄ simply follows a temperature treatment at 120° C. over a period of 60 hours. After decanting and washing with diesel oil, a light brown suspension is obtained which is diluted with diesel oil to a concentration of 16.1 mg atom Ti/l. This suspension is used in Examples 4 and 5.

Example 4

The polymerization is carried out under the conditions of Example 1. 15.5 ml of Catalyst B and 3.7 mmoles TEA are used as the catalyst.

175 g of polyethylene is obtained per hour, corresponding to a polymer yield of 3640 g polyethylene/g Ti per bar ethylene per hour. The polymer has a viscosity number of 23.9 dl/g.

Example 5

The polymerization is carried out under the conditions of Example 2. 21.7 ml of Catalyst B as a suspension and 5.1 mmoles of TEA are used as the catalyst.

140 g of polyethylene is obtained per hour, corresponding to a polymer yield of 2780 g polyethylene/g Ti per bar ethylene per hour. The polymer has a melt index (MFI 190/5) of 0.82 g/10 minutes.

Catalyst C 20 g of the dried silicon dioxide used in the preparation of Catalyst A is suspended while stirring in 125 ml of a diesel oil in a dry 1 liter volume, three-necked flask flushed with nitrogen and equipped with a paddle stirrer. 104 mmoles butyl-octyl-magnesium (supplied by Schering AG under the name BOMAG) dissolved in 125 ml diesel oil is then added at 25° C. within 10 minutes. After the addition, the contents are heated to 135° C. and allowed to react for a further 6 hours while stirring. The solid is washed by repeated dilution and decanting with diesel oil until magnesium can no longer be detected in the wash liquid. A suspension having a concentration of 79.5 mmoles Mg/l is prepared by dilution with diesel oil.

2.56 ml ethanol dissolved in 17.4 ml diesel oil is added to 540 ml of this suspension at 20° C. while stirring, and the mixture is allowed to react for 1 hour. The mixture is then heated to 85° C. and a solution of 63.7 mmoles TiCl₄ in 93 ml diesel oil is then added dropwise within 4 hours. The mixture is stirred for a further 15 minutes, diluted with diesel oil, and the solid is freed from unreacted Ti compounds by repeated decanting and dilution. A suspension having a concentration of 30.3 mmoles Ti/l is prepared by dilution with diesel oil, and is used in Example 6.

Example 6

The polymerization is carried out under the conditions of Example 1. 8.25 ml of Catalyst C and 3.7 ml diethyl aluminum chloride are used as catalyst component C.

105 g polyethylene is obtained per hour, corresponding to a polymer yield of 2190 g polyethylene/g Ti per bar ethylene per hour. The polymer has a viscosity number of 24.1 dl/g.

It is shown in the following comparison example that no highly active catalysts are obtained if the still intact organomagnesium compound simply absorbs the organomagnesium alkoxide compound on the metal oxide surface, without the hydrogen atoms in the hydroxyl group being substituted.

Catalyst D (comparison)

20 g of the silicon dioxide used in the preparation of Catalyst A is suspended under nitrogen in 125 ml of diesel oil. 47.5 mmoles butyl-octyl-magnesium dissolved in 156 ml diesel oil is added dropwise to this suspension while stirring (300 rpm) at 25° C. within 2 hours, and the suspension is stirred for a further 3.5 hours at 25° C. The suspension is then washed as in the preparation of the Catalyst A, until the last wash solution contains no magnesium compound. Analysis of the suspension shows 32.4 mg atom Mg in 150 ml diesel oil.

48.6 mmoles TiCl4 dissolved in 47 ml diesel oil is added dropwise to this suspension within 3 hours while stirring (450 rpm) at 90° C., and the suspension is allowed to react for a further 30 minutes. After cooling to 65° C., the suspension is diluted with a further 500 ml of diesel oil and washed four times by decanting with 550 ml diesel oil. The resulting brownish-black suspension contains 29.8 mg atom Ti/l and used in Example 7 (comparison).

Example 7

The procedure is as set forth in Example 1, except that 16.8 ml of Catalyst D and 10 mmoles TEA are used. 90 g of polyethylene is obtained per hour, corresponding to a polymer yield of 940 g polyethylene/g Ti per bar ethylene per hour. The polymer processed after 5 hours has no melt index, and the viscosity number is 14.5 dl/g.

What we claim is:

1. A catalyst for the polymerization of α-olefins comprising
   (a) a porous metal oxide containing magnesium monoalkoxy groups,
   (b) a transition metal compound and
   (c) at least one organometallic compound of metals belonging to Groups I to III of the Periodic Table, wherein said magnesium monoalkoxy groups are bound to said metal oxide via at least one oxygen atom.

2. The catalyst of claim 1, wherein said catalyst is a product of the reaction of (a) and (b).

3. The catalyst of claim 2, wherein said magnesium monoalkoxy group is —Mg—O—$R^3$, wherein $R^3$ is a straight or branched chain alkyl containing 1-10 carbons.

4. The catalyst of claim 3, which is the reaction product of an alcohol $R^3OH$ with the reaction product of (A) a diorgano magnesium compound $R^1R^2Mg$, wherein $R^1$ and $R^2$ are individually straight or branched chain alkyls having 1 to 16 carbons, or unsubstituted phenyl groups and (B) hydroxyl group-containing metal oxide.

5. The catalyst of claim 3, which is the reaction product of $R^1$—Mg—$OR^3$, and a hydroxyl group-containing metal oxide wherein $R^1$ is a straight or branched chain alkyl having 1-16 carbons or unsubstituted phenyl group.

6. The catalyst of claim 1, wherein said component (a) is in finely particulate form.

7. The catalyst of claim 6, wherein said porous metal oxide has a pore volume of about 0.1 to about 2 cm$^3$/g and a specific surface of about 50 to about 1000 m$^2$/g before it is reacted to form said metal oxide containing magnesium monoalkoxy groups.

8. The catalyst of claim 1, wherein said metal oxide has reactive hydroxyl groups prior to reaction with an organo magnesium compound.

9. The catalyst of claim 6, wherein said particles have a particle size of about 1 to about 250 μm.

10. The catalyst of claim 1, wherein said transition metal compounds are compounds of metals of Groups IV, V and VI of the Periodic Table.

11. The catalyst of claim 1, wherein said transition metal compounds are halides, halogen alkoxides or alkoxides of said transition metals.

12. The catalyst of claim 10, wherein said transition metal is titanium or vanadium.

13. The catalyst of claim 11, wherein said transition metal is titanium or vanadium.

14. The catalyst of claim 1, wherein said metal oxide is a silicon oxide or an aluminum oxide.

15. The catalyst of claim 1, wherein said (c) is a compound of Li, Mg or Al.

16. The catalyst of claim 1, wherein said (c) is $M^1R^4$, $M^2R_m^4X_{2-m}$, $M^3R_n^4X_{3-n}$, wherein $M^1$, $M^2$, and $M^3$ are metals of Group I, II and III respectively, $R^4$ is straight or branched chain alkyl of 1-16 carbons or unsubstituted phenyl, or mixtures thereof, X is chlorine, bromine, iodine or hydrogen, or mixtures thereof, m is 1 or 2 and n is 1, 2 or 3.

17. The catalyst of claim 1, wherein the molar ratio of said (a) to transition metal is 0.1 to 10.

18. A process for producing the catalyst of claim 1, comprising reacting said (a) with said (b) to form a particulate solid and then adding said (c).

19. The process of claim 18, wherein said magnesium monoalkoxy groups are bound through oxygen to said metal oxide.

20. The process of claim 19 comprising reacting an organomagnesium alkoxide of the general formula $R^1MgOR^3$ with a finely particulate, porous, hydroxyl group-containing metal oxide.

21. The process of claim 19, comprising forming said bound metal oxide by reacting a finely particulate, porous, hydroxyl group-containing metal oxide with a magnesium compound of the general formula $R^1R^2Mg$, wherein $R^1$ and $R^2$ are individually straight or branched chain alkyl with 1 to 16 carbon atoms or unsubstituted phenyl, washing out excess magnesium compound to form said solid, and reacting said solid with an amount of alcohol of the general formula $R^3OH$, wherein $R^3$ is straight or branched chain alkyl with 1 to 10 carbon atoms, said amount being equivalent to the amount of magnesium bound via oxygen.

22. The process of claim 21, wherein the finely particulate, porous, hydroxyl group-containing metal oxide is at least one of a silicon oxide or an aluminum oxide.

23. The process of claim 21, wherein said finely particulate, porous, hydroxyl group-containing metal oxide has a particle size of 1 to 250 μm, a specific surface of 50 to 1000 m$^2$/g, and a pore volume between 0.1 to 2 cm$^3$/g.

24. The process of claim 18, wherein said transition metal compounds are halides, halogen alkoxides and/or alkoxides.

25. The process of claim 18, wherein said transition metals are of Sub-Groups IV-VI of the Periodic Table.

26. The process of claim 25, wherein said transition metal is titanium or vanadium.

27. The process according to claim 18, wherein the molar ratio of magnesium contained in said metal oxide to the transition metal compound is about 0.1 to about 10.

28. The process according to claim 18, wherein said organometallic compound is of Li, Mg or Al.

29. The process of claim 18, wherein said organometallic compound has the general formula $M^1$, $M^2R_m^4X_{2-m}$, $M^3R_n^4X_{3-n}$, wherein $M^1$, $M^2$, $M^3$ are metals of Groups I to III of the Periodic Table, respectively, $R^4$ is straight or branched chain alkyl with 1 to 16 carbon atoms, unsubstituted phenyl, or mixtures thereof, X is chlorine, bromine, iodine, hydrogen, or mixtures thereof, m is 1 or 2, and n is 1 to 3.

30. The catalyst of claim 17, wherein said ratio is 0.5 to 2.0.

31. The process of claim 20, wherein said finely particulate, porous hydroxyl group-containing metal oxide is at least one of a silicon oxide and an aluminum oxide.

32. The process of claim 20, wherein said finely particulate metal oxide has a particle size of about 1 to about 250 µm, a specific surface of 50 to 1000 $m^2/g$, and a pore volume of 0.1 to 2.0 $cm^3/g$.

33. The process of claim 27, wherein said molar ratio is 0.5 to 2.0.

* * * * *